(12) United States Patent
Kim

(10) Patent No.: US 10,286,889 B2
(45) Date of Patent: May 14, 2019

(54) DOUBLE-LIP SEAL OF PNEUMATIC SPRING BRAKE CHAMBER FOR VEHICLE

(71) Applicant: MIRAEVC CO., LTD., Jeollabuk-do (KR)

(72) Inventor: Yeon Min Kim, Seoul (KR)

(73) Assignee: MIRAEVC CO., LTD., Jeollabuk-do (KR)

( * ) Notice: Subject to any disclaimer, the term of this patent is extended or adjusted under 35 U.S.C. 154(b) by 0 days.

(21) Appl. No.: 15/612,214

(22) Filed: Jun. 2, 2017

(65) Prior Publication Data

US 2018/0345944 A1    Dec. 6, 2018

(51) Int. Cl.
| | |
|---|---|
| *B60T 17/08* | (2006.01) |
| *F16D 65/28* | (2006.01) |
| *F16D 121/10* | (2012.01) |
| *F16D 125/08* | (2012.01) |
| *F16D 125/12* | (2012.01) |
| *F16D 125/58* | (2012.01) |

(52) U.S. Cl.
CPC ............ *B60T 17/083* (2013.01); *F16D 65/28* (2013.01); *F16D 2121/10* (2013.01); *F16D 2125/08* (2013.01); *F16D 2125/12* (2013.01); *F16D 2125/585* (2013.01)

(58) Field of Classification Search
CPC ........ B60T 17/083; B60T 13/38; F16D 65/28; F16D 2121/08; F16D 2121/10; F16D 2125/12; F16D 2125/585; F16D 2125/08
USPC ............................ 188/170, 106 F; 92/48, 63
See application file for complete search history.

(56) References Cited

U.S. PATENT DOCUMENTS

| | | | | |
|---|---|---|---|---|
| 5,215,170 | A | * | 6/1993 | Rapa ..................... B60T 17/083 188/170 |
| 5,722,311 | A | * | 3/1998 | Pierce .................. B60T 17/083 92/130 A |
| 2013/0032437 | A1 | * | 2/2013 | Akin ....................... B60T 17/08 188/106 F |
| 2013/0292216 | A1 | * | 11/2013 | Bradford .............. B60T 17/083 188/106 F |
| 2017/0050628 | A1 | * | 2/2017 | Park ....................... B60T 13/38 |
| 2017/0051803 | A1 | * | 2/2017 | Park ....................... B60T 13/38 |

FOREIGN PATENT DOCUMENTS

| | | | | |
|---|---|---|---|---|
| EP | 0554050 A1 | * | 8/1993 | ............ B60T 17/083 |
| KR | 10-1176856 | | 8/2012 | |
| KR | 101539892 B1 | * | 7/2015 | .............. B60T 13/38 |

* cited by examiner

*Primary Examiner* — Pamela Rodriguez

(57) ABSTRACT

The present disclosure relates to a double-lip seal of a pneumatic spring brake chamber for a vehicle, the double-lip seal has sealing performance between an inner circumferential surface of a through-hole of an adaptor housing and an outer circumferential surface of an actuator rod to prevent degradation in sealing performance of the lip seal, thereby maintaining constant sealing performance and preventing fluid leakage.

5 Claims, 4 Drawing Sheets

DOUBLE-LIP SEAL OF PNEUMATIC SPRING BRAKE CHAMBER FOR VEHICLE

BACKGROUND OF THE INVENTION

Field of the Invention

The present disclosure relates to a double-lip seal of a pneumatic spring brake chamber for a vehicle, and more particularly, to a double-lip seal of a pneumatic spring brake chamber for a vehicle with increased sealing performance between an inner circumferential surface of a through-hole of an adaptor housing and an outer circumferential surface of an actuator rod to prevent fluid leakage.

Description of the Related Art

Large vehicles such as buses, trucks, trailers, and other heavy machinery use a brake chamber for vehicles that performs delicate and fast braking operation while high-speed driving or parking and has good braking performance.

Seeing the structure of a vehicle brake chamber, the vehicle brake chamber includes a head housing, an adaptor housing and a bottom housing of a hollow shape in a sequential order from the top. On the other hand, a piston is placed between the head housing and the adaptor housing, and a hollow actuator rod is connected to the piston and placed through a through-hole of the adaptor housing. A diaphragm is placed between the adaptor housing and the bottom housing. Furthermore, a pressure plate supporting the diaphragm and a push rod supporting the pressure plate are provided, and the push rod is placed through the through-hole formed in the bottom housing.

In this instance, a space formed between the head housing and the piston is a spring chamber, and a spring is placed therein. A space provided between the piston and the adaptor housing is a pressure chamber. A space formed between the adaptor housing and the diaphragm is a service chamber, and a push rod chamber is formed between the diaphragm and the bottom housing.

As described above, the vehicle brake chamber is composed of the spring chamber, the pressure chamber, the service chamber, and the push rod chamber from top to bottom, and as the pressure plate moves up and down by adjustment of the elastic force of the spring and the air pressure in the service chamber, the push rod connected through the lower end of the bottom housing is moved, allowing the brake to operate while the vehicle is driving or parked.

In this instance, a sealant is applied between the inner circumferential surface of the through-hole of the adaptor housing and the outer circumferential surface of the actuator rod to prevent air from leaking. However, the conventional sealant has a weak contact force with the inner circumferential surface of the through-hole of the adaptor housing and the actuator rod, resulting in reduced sealing function, and impurities entering the housing may push the contacted part of the sealant, causing degradation in sealing performance.

SUMMARY OF THE INVENTION

The present disclosure is directed to providing a double-lip seal of a pneumatic spring brake chamber in which a lip seal placed between an inner circumferential surface of an adaptor housing and an outer circumferential surface of an actuator rod has a groove to receive impurities therein, in order to prevent the sealing performance degradation by virtue of impurities caught in the groove at the initial stage.

To achieve the object, a double-lip seal of a pneumatic spring brake chamber for a vehicle according to an embodiment of the present disclosure includes a head housing, a bottom housing, an adaptor housing provided between the head housing and the bottom housing to connect the head housing to the bottom housing, a piston that moves along an inner circumferential surface of the head housing, a hollow actuator rod that is connected to the piston and moves in an axial direction along a through-hole of the adaptor housing, and a lip seal that sealingly contacts an outer circumferential surface of the adaptor housing and an inner circumferential surface of the through-hole to prevent fluid leakage, wherein the lip seal includes a first lip portion, a connecting portion and a second lip portion integrally formed in a sequential order along an axial direction, and is formed in a hollow shape contacting with the outer circumferential surface of the actuator rod and the inner circumferential surface of the adaptor housing, the first lip portion further includes a first inner lip and a first outer lip at two sides of an upper end, the first inner lip and the first outer lip being spread apart at a predetermined angle toward the inner circumferential surface of the adaptor housing and the outer circumferential surface of the actuator rod, the second lip portion further includes a second inner lip and a second outer lip at two sides of an upper end, the second inner lip and the second outer lip being spread apart at a predetermined angle toward the inner circumferential surface of the adaptor housing and the outer circumferential surface of the actuator rod, and the lip seal has a groove to receive an impurity therein on at least one surface of the inner circumferential surface and the outer circumferential surface of the lip seal that touch the outer circumferential surface of the actuator rod and the inner circumferential surface of the adaptor housing along a perimeter direction of the contact surface.

Here, the first inner lip, the first outer lip, the second inner lip, and the second outer lip are formed juttingly and spread apart at an angle of 15-20 degrees along an axial direction.

The double-lip seal of a pneumatic spring brake chamber for a vehicle according to the present disclosure uses a lip seal having a groove between the inner circumferential surface of the through-hole of the adaptor housing and the outer circumferential surface of the actuator rod, to prevent degradation in sealing performance of the lip seal by virtue of impurities caught in the groove at the initial stage, thereby maintaining constant sealing performance and preventing fluid leakage.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
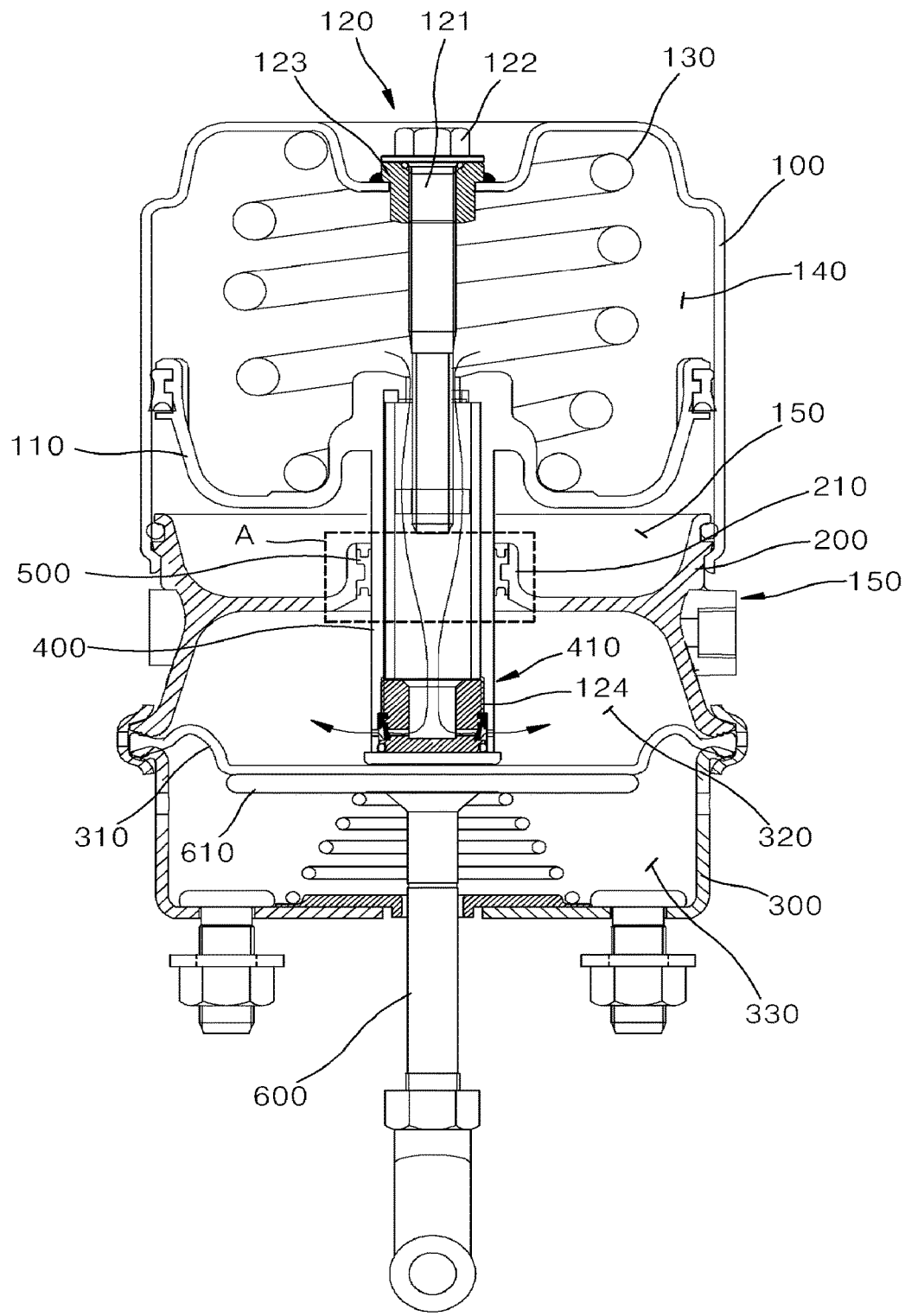
FIG. 1 is a cross-sectional view showing configuration of a pneumatic spring brake chamber for a vehicle according to an embodiment of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 2:
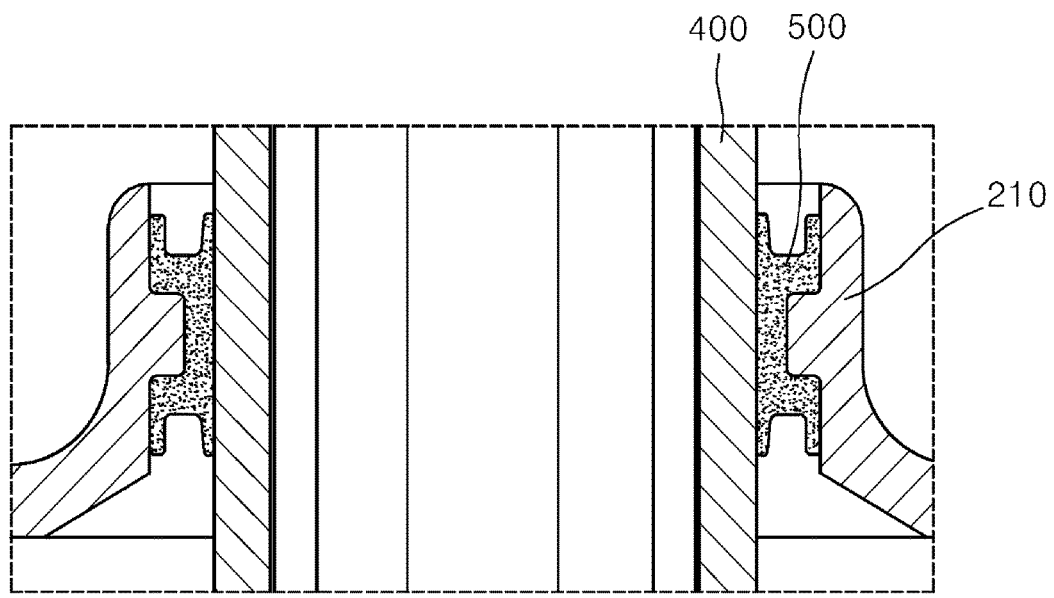
FIG. 2 is an enlarged view of section "A" in FIG. 1.

FIG. 1 is a cross-sectional view showing configuration of a pneumatic spring brake chamber for a vehicle according to an embodiment of the present disclosure, and FIG. 2 is an enlarged view of section "A" in FIG. 1.

To describe a double-lip seal of a brake chamber for a vehicle according to the present disclosure, the entire configuration of a pneumatic spring brake chamber for a vehicle is described in detail with reference to FIG. 1. In this instance, FIG. 1 is a diagram showing that compressed air starts to flow into a pressure chamber while a vehicle is parked by operation of a parking brake.

The pneumatic spring brake chamber for a vehicle has a flow of air between a spring chamber 140 and a service chamber 320 through a hollow actuator rod 400 placed between the spring chamber 140 and the service chamber 320 and an actuator rod valve 410 connected to the lower end of the actuator rod 400.

The pneumatic spring brake chamber for a vehicle includes a head housing 100, an adaptor housing 200 and a bottom housing 300 of a hollow shape in a sequential order from the top, and a piston 110 is placed between the head housing 100 and the adaptor housing 200, and a diaphragm 310 is placed between the adaptor housing 200 and the bottom housing 300.

Furthermore, the actuator rod 400 has a through-hole running through the adaptor housing 200 in the downward direction of a piston through-hole formed in the piston 110, and a rod valve 410 is placed at the end of the actuator rod 400. The rod valve 410 brings the spring chamber 140 and the service chamber 320 into communication with each other, allowing air to flow. Although this embodiment shows that the piston 110 and the actuator rod 400 are integrally formed, the piston 110 and the actuator rod 400 may be formed separately and connected to each other.

The pneumatic spring brake chamber for a vehicle has the spring chamber 140 between the head housing 100 and the piston 110, and a pressure chamber 150 between the piston 110 and the adaptor housing 200. Furthermore, the pneumatic spring brake chamber for a vehicle has the service chamber 320 between the adaptor housing 200 and the diaphragm 310, and a push rod chamber 330 between the diaphragm 310 and the bottom housing 300.

A compressive sprig 130 is a coil spring placed in the spring chamber 140, and the cross-sectional diameter of the coil becomes smaller as it goes from the center of the coil toward two side ends. In this instance, the compressive spring 130 is contacted with and supported on the piston 110 at one end, and is contacted with and supported on a curve of the head housing 100 at the other end.

On the other hand, the head housing 100 has a curve along the inner side of the head housing 100 at the upper end part, and the curve prevents the compressive spring 130 from moving its position at the upper part, so that the compressive spring 130 is compressed, always maintaining a constant center axis.

The piston 110 is tightly fitted to the inner part of the head housing 100, and divides an inner space of the head housing 100 into the pressure chamber 150 and the spring chamber 140. The hollow actuator rod 400 is placed in the piston through-hole of the piston 110 along one direction. Accordingly, the actuator rod 400 is, at one end, connected to and supported on the piston 110, and at the other end, is supported on the diaphragm 310 through the through-hole of the adaptor housing 200.

A caging bolt assembly 120 is placed from the outer side of the head housing 100 to the inner side in the hollow actuator rod 400. The caging bolt assembly 120 can be used for mechanical disassembly of the pneumatic spring brake chamber for a vehicle or assembly of the vehicle brake chamber when the pneumatic spring brake chamber for a vehicle is damaged.

The caging bolt assembly 120 includes an adjustment nut 122 screw-connected to a caging bolt 121. In this instance, the caging bolt 121 and a caging bolt head 124 are placed in the hollow actuator rod 400. On the other hand, the caging bolt assembly 120 is fixed by screw connection through a collar 123 in a such way that the other end of the caging bolt 121 extends to the outside of the head housing 100 through an axial direction opening, which is sealed. The adjustment nut 122 may be fixed to the caging bolt 121 permanently or semi-permanently. The caging bolt assembly 120 can mechanically compress and support the compressive spring 130 on which a great force in compressed condition acts, and the screw connection of the caging bolt 121 in the head housing 100 can be released by rotating the adjustment nut 122.

The adaptor housing 200 is placed between the head housing 100 and the bottom housing 300 to interconnect the head housing 100 and the bottom housing 300. The adaptor housing 200 has a through-hole at the center, and the actuator rod 400 is contacted with and supported on the diaphragm 310 in the bottom housing 300 through the through-hole.

In this instance, the diaphragm 310 is placed in the bottom housing 300, and is contacted with and supported on a pressure plate 610 and divides the bottom housing 300 into the service chamber 320 and a push rod chamber 330. The pressure plate 610 is supported on a push rod 600, and plays a role in transmitting a movement of the diaphragm 310 induced by the air pressure to the push rod 600.

Accordingly, the diaphragm 310 moves up and down the pressure plate 610 by adjustment of the elastic force of the compressive spring 130 in the spring chamber 140 and the air pressure in the pressure chamber 150, so that operation of the brake (not shown) connected to the lower end of the push rod 600 formed moveably up and down through the lower end of the bottom housing 300 can be controlled.

In this instance, the lip seal 500 is placed at a region where the outer circumferential surface of the actuator rod 400 and the inner circumferential surface of the adaptor housing 200 come into contact with each other to prevent fluid leakage, and hereinafter the lip seal 500 is described in further detail.

Figure 3:
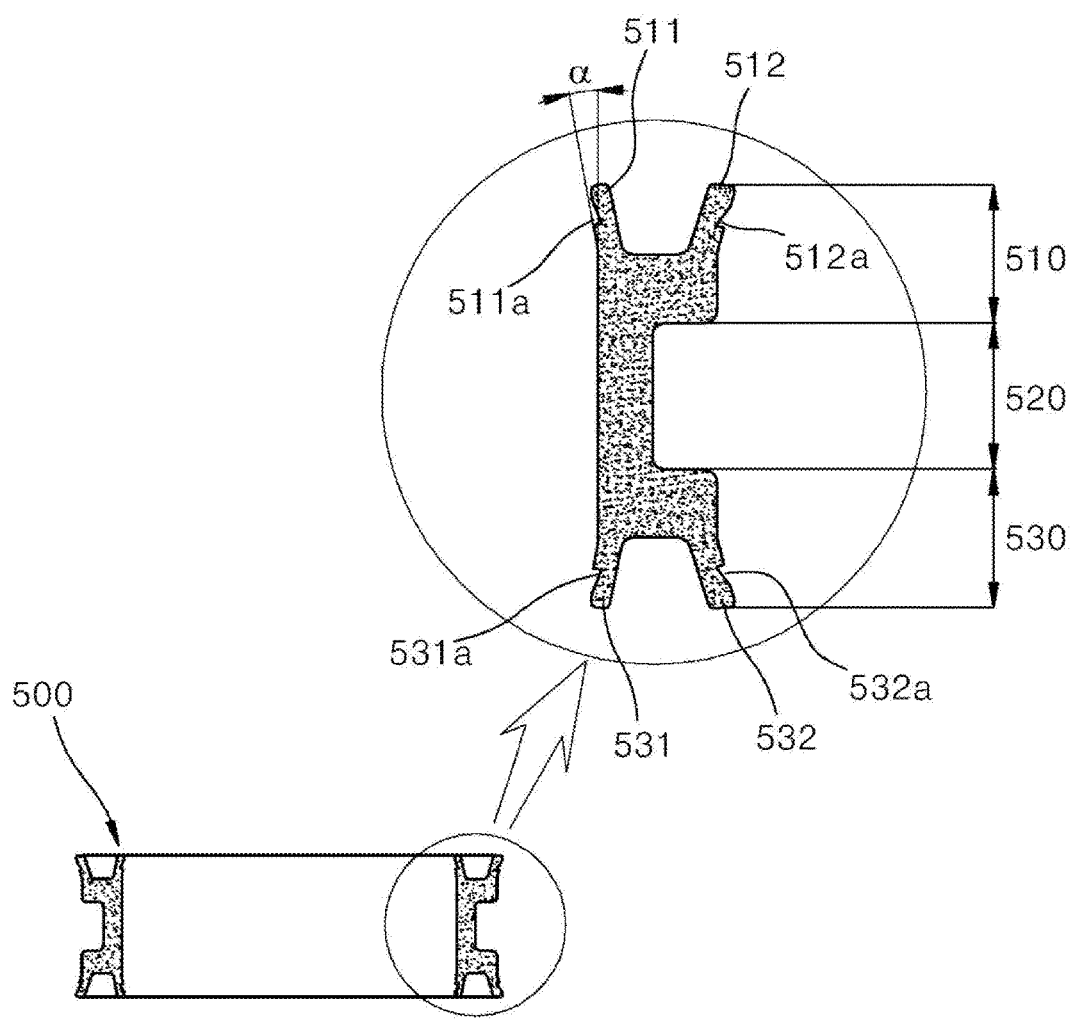
FIG. 3 is a cross-sectional view of a double-lip seal of a pneumatic spring brake chamber for a vehicle according to an embodiment of the present disclosure, before connected.
Figure 4:
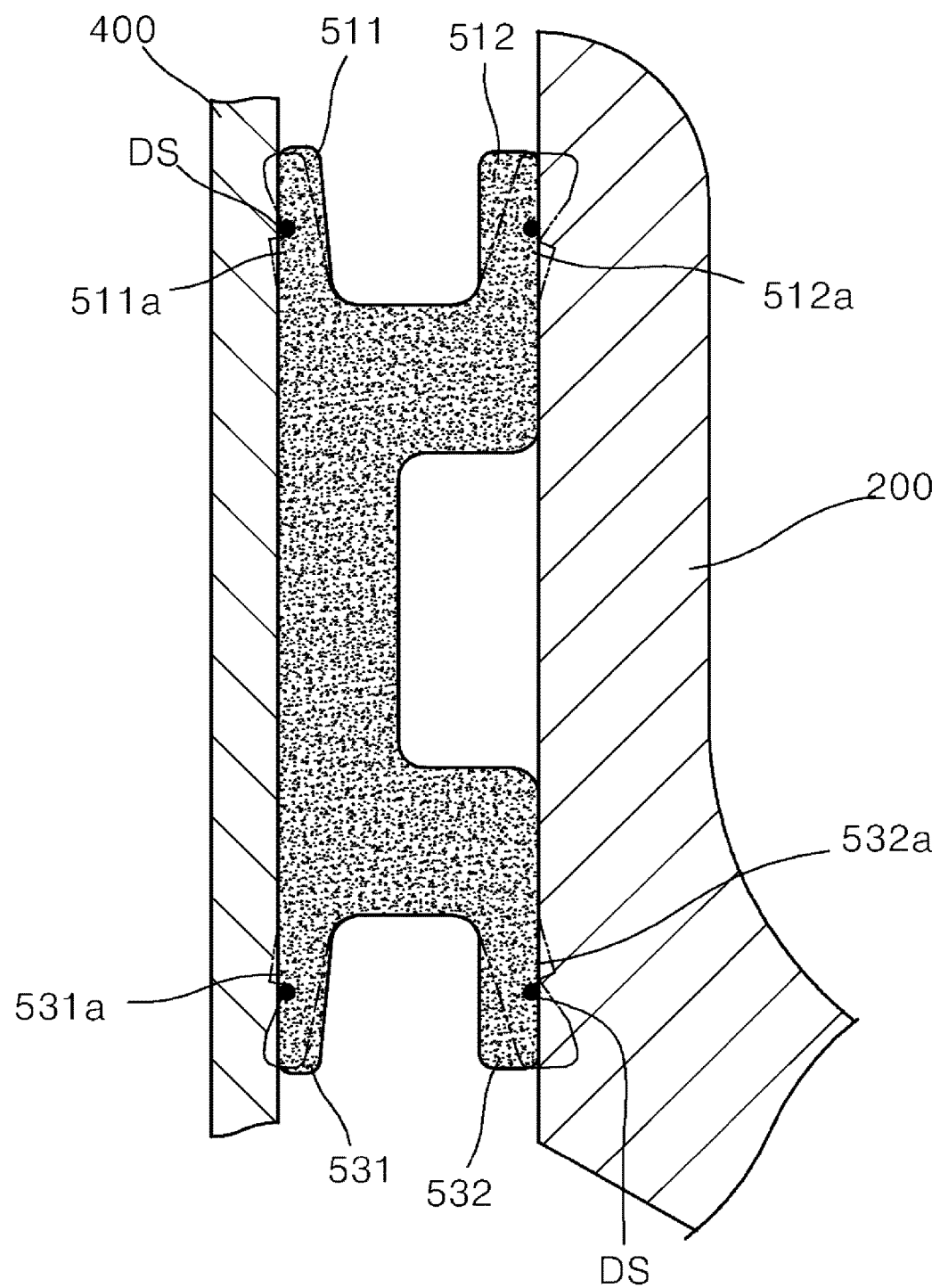
FIG. 4 is a conceptual view of operation of a double-lip seal of a pneumatic spring brake chamber for a vehicle according to an embodiment of the present disclosure.

FIG. 3 is a cross-sectional view a double-lip seal of a pneumatic spring brake chamber for a vehicle according to an embodiment of the present disclosure before connected, and FIG. 4 is a conceptual view of operation of a double-lip seal of a pneumatic spring brake chamber for a vehicle according to an embodiment of the present disclosure.

The lip seal 500 is described with reference to FIGS. 3 and 4, and for the components not indicated herein, a reference is made to FIG. 1.

The lip seal 500 includes a lip portion 510, a connecting portion 520, and a second lip portion 530 integrally formed in a hollow shape in a sequential order along the axial direction, and is placed between the outer circumferential surface of the actuator rod 400 and the inner circumferential surface of the adaptor housing 200. As described above, the entire shape of the lip seal 500 may be a hollow cylindrical shape.

The lip seal 500 has a groove in the connecting portion 520, and the groove is fixed to a protrusion 210 formed on the inner circumferential surface of the adaptor housing 200. Thereby, the outer diameter of the connecting portion 520 is smaller than those of the first lip portion 510 and the second lip portion 530.

As described above, the lip seal 500 is placed between the actuator rod 400 and the adaptor housing 200 to prevent air from leaking between the pressure chamber 150 and the service chamber 320, so that the pressure set for each of the pressure chamber 150 and the service chamber 320 can be maintained. Furthermore, the lip seal 500 is firmly fixed to the protrusion 210 of the adaptor housing 200, thereby preventing the separation from the adaptor housing 200.

On the other hand, the first lip portion 510 has a first inner lip 511 and a first outer lip 512 at two sides of the upper end, and the first inner lip 511 and the first outer lip 512 are spread apart at a predetermined angle toward the inner circumferential surface of the adaptor housing 200 and the outer circumferential surface of the actuator rod 400. Because each of the first inner lip 511 and the first outer lip 512 is spread apart toward the inner circumferential surface of the adaptor housing 200 and the outer circumferential surface of the actuator rod 400, when they are placed between the adaptor housing 200 and the actuator rod 400, the contact force further increases and tight sealing is achieved.

Furthermore, the second lip portion 530 has a second inner lip 531 and a second outer lip 532 at two sides of the upper end, and the second inner lip 531 and the second outer lip 532 are spread apart at a predetermined angle toward the inner circumferential surface of the adaptor housing 200 and the outer circumferential surface of the actuator rod 400. Because each of the second inner lip 531 and the second outer lip 532 is spread apart toward the inner circumferential surface of the adaptor housing 200 and the outer circumferential surface of the actuator rod 400, when they are placed between the adaptor housing 200 and the actuator rod 400, the contact force increases and tight sealing is achieved.

In this instance, the lip seal 500 has grooves 511a, 512a, 531a, 532a to receive impurities therein along the perimeter direction on at least one surface of the outer circumferential surface and the inner circumferential surface of the lip seal 500 that touch the outer circumferential surface of the actuator rod 400 and the inner circumferential surface of the adaptor housing 200. The grooves are preferably provided at the end of the first inner lip 511, the first outer lip 512, the second inner lip 531, and the second outer lip 532 to force incoming impurities to be caught at the initial stage, thereby increasing the sealing effect.

The grooves 511a, 512a, 531a, 532a receive impurities entering between the adaptor housing 200 and the service chamber 320, and through the received impurities, further impurity penetration between the outer circumferential surface of the actuator rod 400 and the inner circumferential surface of the adaptor housing 200 is prevented, and sealing effect reduction caused by continuous impurity penetration is avoided.

That is, when impurities Ds are caught in the grooves 511a, 512a, 531a, 532a, the impurities Ds exhibit a sealing effect similar to rubber of a ring shape along the perimeter direction of the lip seal 500 as shown in FIG. 4, thereby preventing further impurity penetration and increasing the sealing effect. As described above, the grooves 511a, 512a, 531a, 532a form a double lip such as a step at the end of the first inner lip 511, the first outer lip 512, the second inner lip 531, and the second outer lip 532, and the sealing effect increases through the formed double lip.

Here, the first inner lip 511, the first outer lip 512, the second inner lip 531, and the second outer lip 532 are preferably formed juttingly and spread apart at 15-20 degrees along the axial direction.

If they protrude and are spread apart at angles smaller than the set angle of 15 degrees, there is a limitation in increasing the contact force between the outer circumferential surface of the actuator rod 400 and the inner circumferential surface of the adaptor housing 200, making it difficult to sufficiently increase the sealing effect. On the contrary, if they protrude and are spread apart at angles greater than the set angle of 20 degrees, it is difficult to assemble when placing the lip seal 500 between the outer circumferential surface of the actuator rod 400 and the inner circumferential surface of the adaptor housing 200, causing damage to the lip seal 500 during assembling. For this reason, the first inner lip 511, the first outer lip 512, the second inner lip 531 and the second outer lip 532 are preferably formed juttingly within the range set above.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A double-lip seal of a pneumatic spring brake chamber for a vehicle, in which a brake chamber for a vehicle comprises a head housing, a bottom housing, an adaptor housing provided between the head housing and the bottom housing to connect the head housing to the bottom housing, a piston moving along an inner circumferential surface of the head housing, a hollow actuator rod that is connected to the piston and moves in an axial direction along a through-hole of the adaptor housing, and a lip seal that sealingly contacts an outer circumferential surface of the adaptor housing and an inner circumferential surface of the through-hole to prevent fluid leakage,
wherein the lip seal comprises:
a first lip portion;
a connecting portion; and
a second lip portion,
wherein the first lip portion, the connecting lip portion, and the second lip portion are integrally formed in a sequential order along an axial direction and are formed in a hollow shape contacting with the outer circumferential surface of the actuator rod and the inner circumferential surface of the adaptor housing,
wherein the first lip portion further includes a first inner lip and a first outer lip at two sides of an upper end, the first inner lip and the first outer lip being spread apart at a predetermined angle toward the inner circumferential surface of the adaptor housing and the outer circumferential surface of the actuator rod,
wherein the second lip portion further includes a second inner lip and a second outer lip at two sides of an upper end, the second inner lip and the second outer lip being spread apart at a predetermined angle toward the inner circumferential surface of the adaptor housing and the outer circumferential surface of the actuator rod,
wherein the lip seal has a groove to receive an impurity therein on at least one surface of the inner circumferential surface and the outer circumferential surface of the lip seal that touch the outer circumferential surface of the actuator rod and the inner circumferential surface of the adaptor housing along a perimeter direction of at least one of the outer circumferential surface and the inner circumferential surface of the lip seal.

2. The double-lip seal of a pneumatic spring brake chamber for a vehicle of claim 1, wherein the first inner lip, the first outer lip, the second inner lip, and the second outer lip are formed juttingly and spread apart at an angle of 15-20 degrees along an axial direction.

3. A brake chamber for a vehicle comprising:
a head housing;
a bottom housing;
an adaptor housing provided between the head housing and the bottom housing to connect the head housing to the bottom housing;
a piston moving along an inner circumferential surface of the head housing;
a hollow actuator rod that is connected to the piston and moves in an axial direction along a through-hole of the adaptor housing; and
a lip seal that sealingly contacts an outer circumferential surface of the adaptor housing and an inner circumferential surface of the through-hole to prevent fluid leakage,
wherein the lip seal comprises:
a first lip portion;
a connecting portion; and
a second lip portion,
wherein the first lip portion, the connecting lip portion, and the second lip portion are integrally formed in a sequential order along an axial direction and are formed in a hollow shape contacting with the outer circumferential surface of the actuator rod and the inner circumferential surface of the adaptor housing,
wherein the first lip portion further includes a first inner lip and a first outer lip at two sides of an upper end, the first inner lip and the first outer lip being spread apart at a predetermined angle toward the inner circumferential surface of the adaptor housing and the outer circumferential surface of the actuator rod,
wherein the lip seal has a groove to receive an impurity therein on at least one surface of the inner circumferential surface and the outer circumferential surface of the lip seal that touch the outer circumferential surface of the actuator rod and the inner circumferential surface of the adaptor housing along a perimeter direction of at least one of the outer circumferential surface and the inner circumferential surface of the lip seal.

4. The brake chamber for a vehicle of claim 3, wherein the second lip portion further includes a second inner lip and a second outer lip at two sides of an upper end, the second inner lip and the second outer lip being spread apart at a predetermined angle toward the inner circumferential surface of the adaptor housing and the outer circumferential surface of the actuator rod.

5. The brake chamber for a vehicle of claim 4, wherein the first inner lip, the first outer lip, the second inner lip, and the second outer lip are formed juttingly and spread apart at an angle of 15-20 degrees along an axial direction.

* * * * *